(12) United States Patent
Chen et al.

(10) Patent No.: US 10,962,954 B2
(45) Date of Patent: Mar. 30, 2021

(54) SYSTEM AND METHOD FOR MONITORING A MANUFACTURING PLANT

(71) Applicant: Robert Bosch GmbH, Stuttgart (DE)

(72) Inventors: Ruobing Chen, Palo Alto, CA (US); Shan Kang, Mountain View, CA (US); Rumi Ghosh, Campbell, CA (US); Soundar Srinivasan, Sunnyvale, CA (US); Zubin Abraham, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 16/327,273

(22) PCT Filed: Aug. 22, 2017

(86) PCT No.: PCT/US2017/048054
§ 371 (c)(1),
(2) Date: Feb. 21, 2019

(87) PCT Pub. No.: WO2018/039259
PCT Pub. Date: Mar. 1, 2018

(65) Prior Publication Data
US 2019/0227520 A1 Jul. 25, 2019

Related U.S. Application Data

(60) Provisional application No. 62/377,753, filed on Aug. 22, 2016.

(51) Int. Cl.
*G05B 19/406* (2006.01)
*G05B 19/41* (2006.01)
*G05B 19/418* (2006.01)

(52) U.S. Cl.
CPC ..... *G05B 19/406* (2013.01); *G05B 19/41875* (2013.01); *G05B 2219/32179* (2013.01); *Y02P 90/02* (2015.11)

(58) Field of Classification Search
CPC ............ G05B 19/406; G05B 19/41875; G05B 2219/32179; Y02P 90/04; Y02P 90/22
(Continued)

(56) References Cited

U.S. PATENT DOCUMENTS

2006/0282189 A1* 12/2006 Akisawa .......... G05B 19/41875
700/110
2007/0203603 A1 8/2007 Higashide et al.

FOREIGN PATENT DOCUMENTS

JP 2010-027002 A 2/2010
JP 2013-191041 A 9/2013
(Continued)

OTHER PUBLICATIONS

International Search Report and Written Opinion corresponding to PCT Application No. PCT/US2017/048054, dated Jan. 2, 2018 (English language document) (13 pages).

*Primary Examiner* — Michael J Brown
(74) *Attorney, Agent, or Firm* — Maginot, Moore & Beck LLP

(57) ABSTRACT

A manufacturing process system comprises any number of assembly stations and test stations, a model unit, and any number of final products is provided. Any of a sample test method and the statistical distribution monitoring method performed by the model unit is configured to monitor the model quality after it is deployed and reduce potential unnecessary costs, such as warranty claim costs as a result of sending bad units to the customers, and rework costs as a result of predicting a good part as bad and wasting additional testing efforts on the bad parts. Further, both methods are configured to maximize the probability of detecting hazardous issues, while having control of the false alarm rate.

8 Claims, 3 Drawing Sheets

(58) Field of Classification Search
USPC .......................................................... 700/110
See application file for complete search history.

(56) References Cited

FOREIGN PATENT DOCUMENTS

| KR | 10-2004-0091386 A | 10/2004 |
| KR | 10-2008-0070543 A | 7/2008 |

* cited by examiner

SYSTEM AND METHOD FOR MONITORING A MANUFACTURING PLANT

CROSS-REFERENCE TO RELATED APPLICATIONS

This application is a 35 U.S.C. § 371 National Stage Application of PCT/US2017/048054, filed on Aug. 22, 2017, which claims the benefit of U.S. Provisional Application No. 62/377,753, filed on Aug. 22, 2016, the disclosures of which are herein incorporated by reference in their entirety.

FIELD

This disclosure relates generally to monitoring systems and, more particularly, to a system and method for monitoring a manufacturing plant.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for monitoring manufacturing process system. The system comprises a plurality of assembly stations and test stations. A model unit coupled to the plurality of test stations is configured to monitor a plurality of sampled products assembly by the assembly stations and trigger an alert about an event, wherein the event is a manufacturing critical quality value. For example, the manufacturing critical quality value comprising at least one of model degradation, first pass value, overall scrap rate, missed scrap rate, percentage of true good item predicted as bad item. The model unit is at least one of a computer machine, a client device, or a server.

According to another aspect of the disclosure, a method of monitoring a manufacturing process system, performed by a model unit comprises identifying number of true scraps (N) to be observed, identifying number of misclassified scraps (m) to be tolerated out of identified N and calculating at least one of probability for observing m out of N wrongly predicted, given a good model, defined as the false alarm rate and probability for observing m out of N wrongly predicted, given a bad model, defined as the power of test. The method is a sampled test method performed by the model unit.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 1:
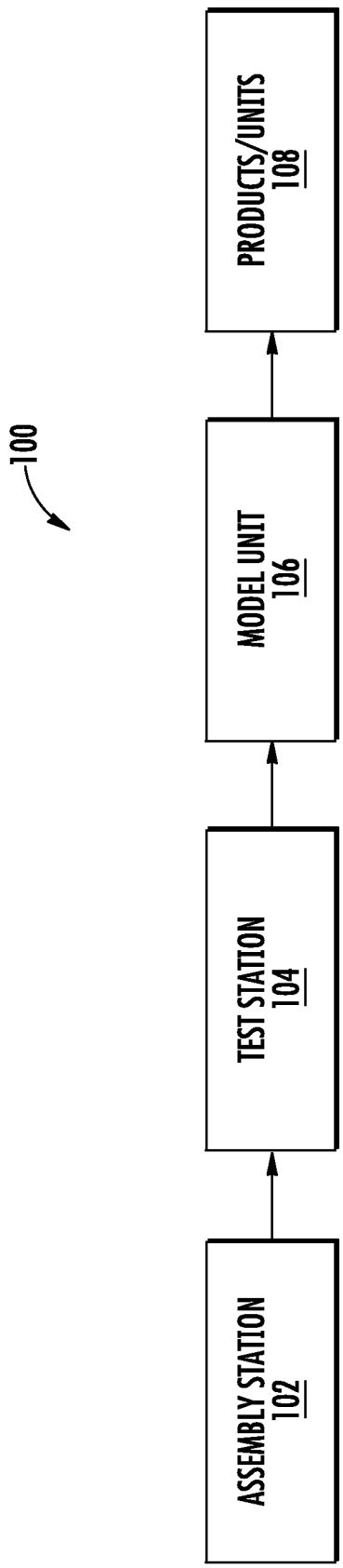
FIG. 1 is a simplified block diagram of a manufacturing process system according to a described embodiment of the disclosure.

FIG. 1 is a simplified block diagram of a manufacturing process system 100 according to a described embodiment of the disclosure. The system 100 provided is one example of a manufacturing process system and the embodiments described herein may be used with any type of assembly line (for example, an assembly line for automotive parts, automobiles, aircrafts, heavy equipment, and the like) and are not limited to the example described herein. The system 100 comprises any number of assembly stations 102 and test stations 104, a model unit 106, and any number of final products 108. The assembly station 102 is used to assemble components together and convert them into a product 108. At test station 104, the product 108 is tested by taking one or more measurements or values (attributes) of the product 108 (for example, size, shape, color, temperature, position, and the like). The attributes may be used to determine whether the product 108 passes or fails one or more approval metrics. When the attributes do not satisfy the approval metrics, the product 108 fails the metrics and the product 108 may be classified as "bad" or "scrap." Conversely, when the attributes satisfy the approval metrics, the product 108 passes the metrics and may be classified as "good." In some embodiments, the measurements may be collected by other stations included in the manufacturing process system 100 and, in some embodiments, the manufacturing process system 100 includes multiple testing stages and associated stations and the end-of-line test may take into account one or more attributes collected by other stations, test results from other testing stations, or a combination thereof. The model unit 106 is configured to perform at least one of (a) statistical model monitoring that involves automatic detection of model degradation; (b) simultaneous monitoring of top manufacturing-critical measures; (c) automatic detection of non-acceptable manufacturing critical quality values; (d) notification and alert messaging when a critical issue occurs; and (e) sample testing method that relies on obtaining some true labels to compare the model and the underlying process. Details of statistical model monitoring method and sample testing method will be further described below.

Figure 2:
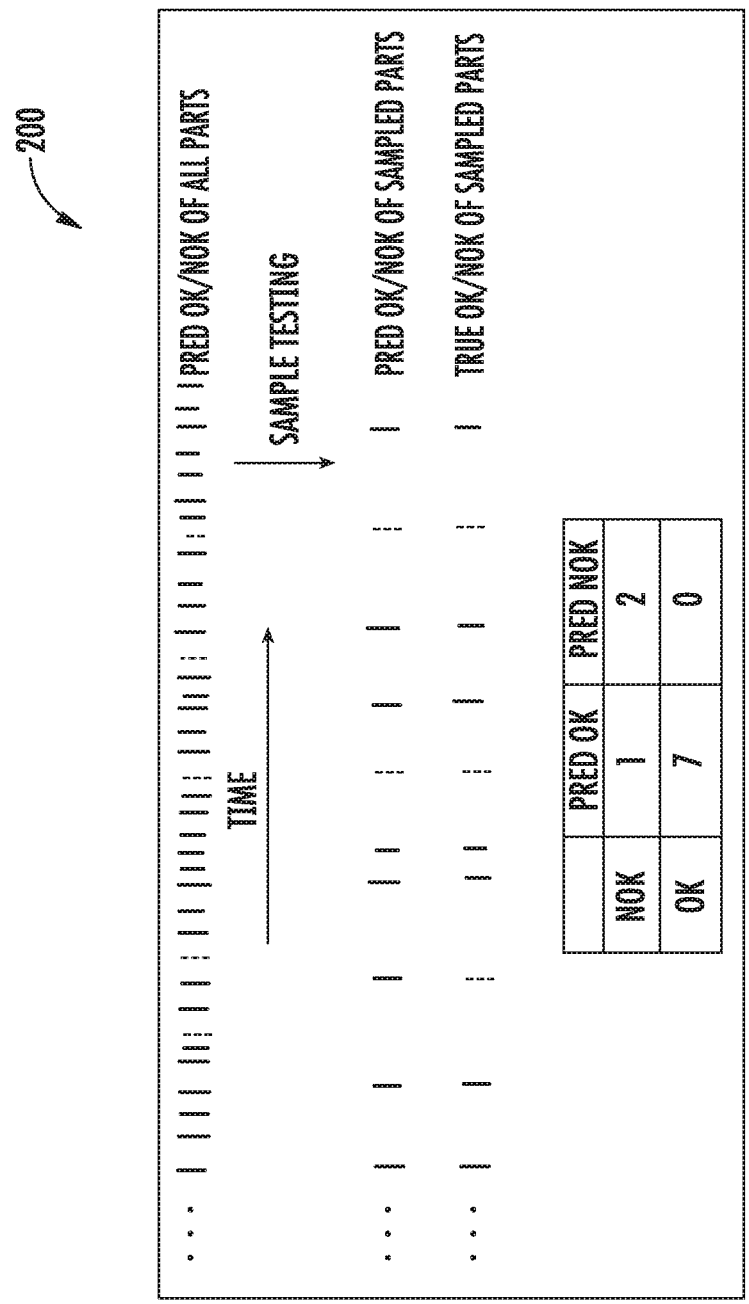
FIG. 2 is a simplified schematic diagram of a sample testing method for the manufacturing process system of FIG. 1 according to a described embodiment of the disclosure.

FIG. 2 is a simplified schematic diagram of a sample testing method 200 for the manufacturing process system of FIG. 1 according to a described embodiment of the disclosure. The sample testing method 200 is performed by a model unit 106 of the manufacturing process system 100 of FIG. 1 for comparing true labels, e.g. good or scrap with predicted labels of sampled products or parts 108. The model unit 106 may be a computer machine, a client device, a server, a machine device or the like. If the misclassified parts or products exceeds a predefined threshold, the model unit triggers an alert and draw a target attention. The target can be an assembly worker, a factory worker, a manufacturing worker, a stakeholder, or combination thereof. The method 200 comprises receiving any number of sampled products to be tested, receiving value of production volume, and receiving value of scrap rate of a particular assembly line. The method 200 further includes setting a threshold a purpose for the test before trigger an alert. For example, if 2 out of 100 true scrap parts are predicted to be a 'good' part, then the model unit 108 triggers an alert. In some embodiments, the method 200 may further comprise setting other parameters such as power of test, false alarm rate, manufacturing critical measure, and so forth. Power of test, for example, includes catching the sampled products when the model unit 106 stops working. False alarm rate, for example, includes probability of falsely rejecting the model when it is still working. Manufacturing critical measure, for example, includes measurements that are completed at the end of line (EOL) or those required by the customers. Such measures determine the quality of the product. A maximum deviation may be set as part of the parameters and the maximum deviation may include tolerances, within which these EOL tests or customer mandated tests should lie for a product to be determined to be of good quality. As an example, the power of test can be set to be higher than 90% and the false alarm rate can be set to be lower than 10%. If the manufacturing-critical measure is missed scrap rate and the missed scrap rate is known to be only 0.5% before the model unit 108 is deployed, then an alert is triggered when the value of the missed scrap, e.g. 3%, is above or higher than the missed scrap rate. In some embodiments, the alert can be set by controlling or maintaining the power and false alarm probability to reduce any discrepancies in the result of mixing bad products with good products during the manufacturing critical measurement. As illustrated in FIG. 2, mixed of good and scrapped bad products are finally assembled. The sample test method 200 performed by the model unit 108 identifies seven true good products out of 10 sampled products as opposed to the conventional method, eight true good products out of 10 sampled products wherein one of the true good product is wrongly predicted.

Figure 3:
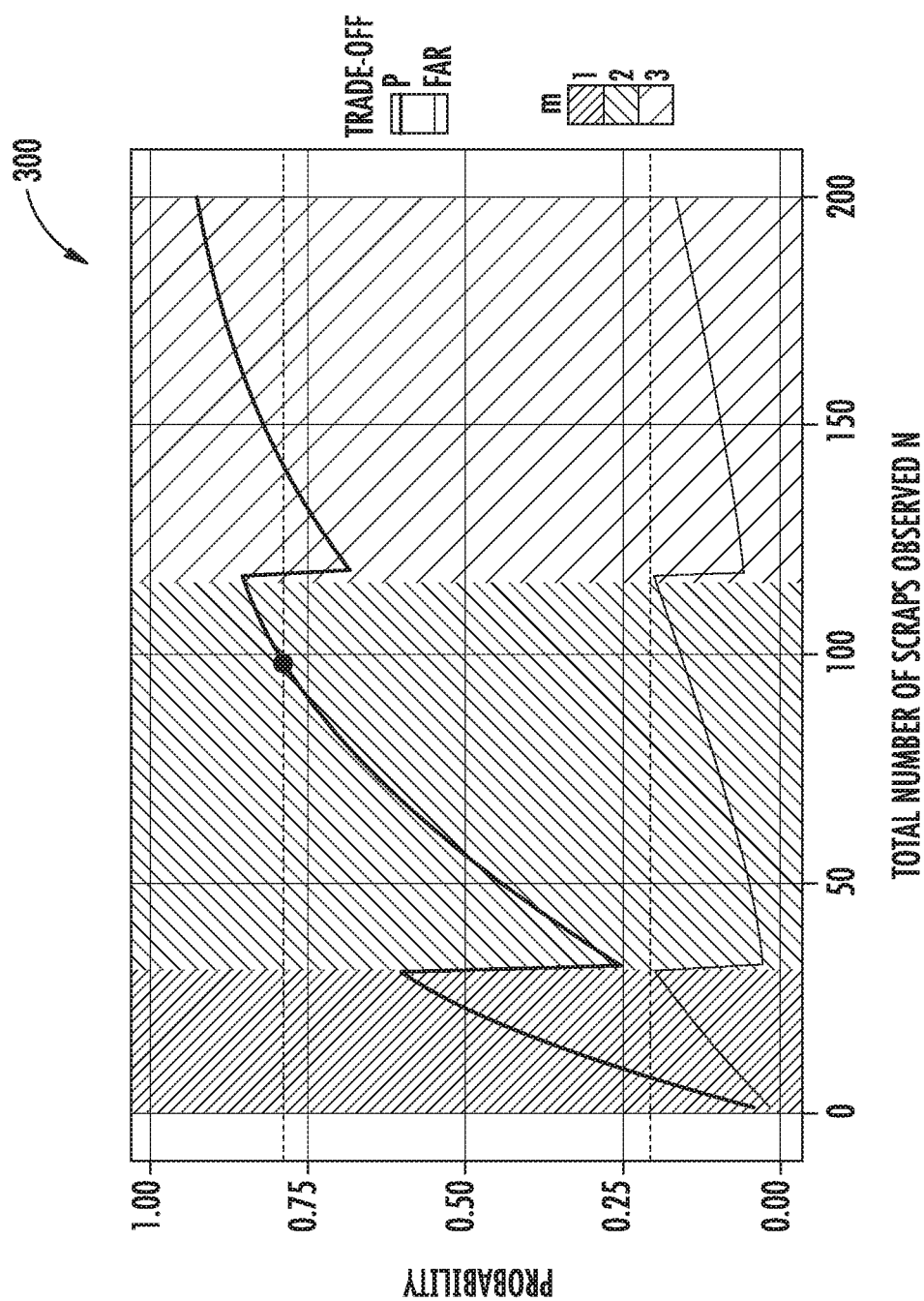
FIG. 3 is a simplified chart of a statistical test for the sample test method performed by a model unit of the manufacturing process system of FIG. 1 according to a described embodiment of the disclosure.

FIG. 3 is a simplified chart of a statistical test procedure 300 for the sample test method 200 performed by a model unit 108 of the manufacturing process system 100 of FIG. 1 according to a described embodiment of the disclosure. Before performing the sample test method 200, a statistical test procedure 300 is defined, e.g. how many true scraps (N) need to be observed from sample testing and, out of N, how many misclassified scraps (m) can be tolerated. For example, for each N and m pair, perform at least one or more of the functions including (a) calculating the probability for observing m out of N wrongly predicted, given a good model (for example, missed scrap rate is 0.5%), defined as the false alarm rate; (b) calculating the probability for observing m out of N wrongly predicted, given a bad model (for example, missed scrap rate is 3%), defined as the power of test; and (c) setting an N-m pair, such that the power of test is higher than 90% for example, the false alarm rate is lower than 10% for example and the time needed for sample testing can be omitted.

Alternatively, a statistical distribution monitoring method performed by the model unit 108 may be used to monitor unexpected changes in the empirical cumulative distribution function (E-CDF) of the output from the statistical test procedure. Given that the statistical test procedure is stationary, the E-CDF converges to a theoretical CDF of the model output. Example tests that quantify the distance between two probability distributions, such as the non-parametric Kolmogorov-Smirnov test (KS test) can be used to track any observed deviations in the E-CDF and the theoretical CDF. An acceptable threshold may be chosen by a domain expert of the manufacturing process system 100, beyond which, any change in the distribution characteristics of the predicted labels detected by the statistical distribution approach, would trigger an alarm. Automatic alert messages about model degradation or other manufacturing critical quality values can be provided to any stakeholders such as plant users. For example, in addition to transmitting a message "Model alert", the manufacturing process system 100 can also provide numerical values on first pass yield, overall scrap rate, missed scrap rate, percentage of truly good parts predicted as bad, etc. Both the sample test method and the statistical distribution monitoring method can used in any of (a) refreshment for streaming data in manufacturing; (b) uncertainty quantification based quality monitoring in manufacturing; and (c) uncertainty quantification based determination of manufacturing critical quality thresholds. Both methods allow the stakeholders to monitor the model quality after it is deployed and reduce potential unnecessary costs, such as warranty claim costs as a result of sending bad units to the customers, and rework costs as a result of predicting a good part as bad and wasting additional testing efforts on the bad parts. Further, both methods maximize the probability of detecting hazardous issues, while having control of the false alarm rate. For example, a hazardous situation could be that all the bad parts that are supposed to be caught by the removed process, now without those testing stations, are predicted as good parts and sent to the customers.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A manufacturing process system comprising:
    a plurality of assembly stations configured to assemble components into a plurality of products;
    at least one first test station configured to test all of the plurality of products;
    at least one second test station configured to test only a sampled subset of the plurality of products; and
    a computer coupled to the at least one first test station and the at least one second test station, the computer configured to:
        classify, using a predictive model, each product in the plurality of products with one of (i) a first classification indicating that the respective product is not to be scrapped, and (ii) a second classification indicating that the respective product is to be scrapped;
        determine, for each product in the sampled subset of the plurality of products, whether the respective product was misclassified by the predictive model based on results from the at least one second test station; and
        trigger an alert in response to a predetermined percentage of the sampled subset of the plurality of products being misclassified by the predictive model.

2. The system of claim 1 wherein the computer is configured to determine at least one manufacturing critical quality value and trigger further alerts depending on the at least one manufacturing critical quality value.

3. The system of claim 2 wherein the at least one further manufacturing critical quality value includes at least one of first pass yield, an overall scrap rate, a missed scrap rate, and a percentage of non-scrap products misclassified by the predictive model as scrap.

4. The system of claim 1 wherein the predetermined percentage is selected such that:
    a probability of observing the predetermined percentage of the sampled subset of the plurality of products being misclassified is less than a first threshold probability when the predictive model is functioning correctly; and
    a probability of observing the predetermined percentage of the sampled subset of the plurality of products being misclassified is greater than a second threshold probability when the predictive model has degraded.

5. A method of monitoring a manufacturing process system, performed by a model unit, the method comprising:
    classifying, using a predictive model, each product in a plurality of products with one of (i) a first classification indicating that the respective product is not to be scrapped, and (ii) a second classification indicating that the respective product is to be scrapped, all of the plurality of products having been assembled by a plurality of assembly stations and tested by at least one first test station;
    determining, for each product in a sampled subset of the plurality of products, whether the respective product was misclassified by the predictive model based on results from at least one second test station, all of the sampled subset of the plurality of products having been further tested by the at least one second test station; and
    triggering an alert in response to a predetermined percentage of the sampled subset of the plurality of products being misclassified by the predictive model.

6. The method of claim 5 wherein the predetermined percentage is selected such that:
    a probability of observing the predetermined percentage of the sampled subset of the plurality of products being misclassified is less than a first threshold probability when the predictive model is functioning correctly; and
    a probability of observing the predetermined percentage of the sampled subset of the plurality of products being misclassified is greater than a second threshold probability when the predictive model has degraded.

7. The method of claim 5 further comprising:
    determining at least one manufacturing critical quality value; and
    triggering further alerts depending on the at least one manufacturing critical quality value.

8. The method of claim 7, wherein the at least one further manufacturing critical quality value includes at least one of first pass yield, an overall scrap rate, a missed scrap rate, and a percentage of non-scrap products misclassified by the predictive model as scrap.

* * * * *